May 8, 1934. C. I. LONGENECKER 1,957,894
VIBRATION DAMPENER FOR FLUID PRESSURE GAUGES
Filed Jan. 6, 1932
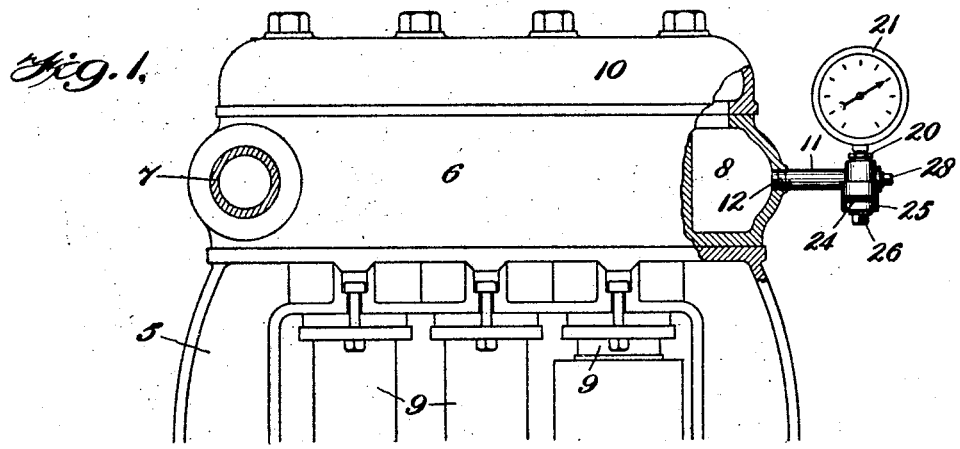
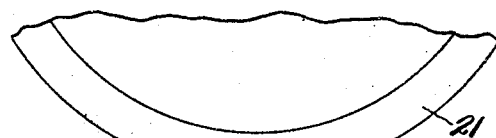
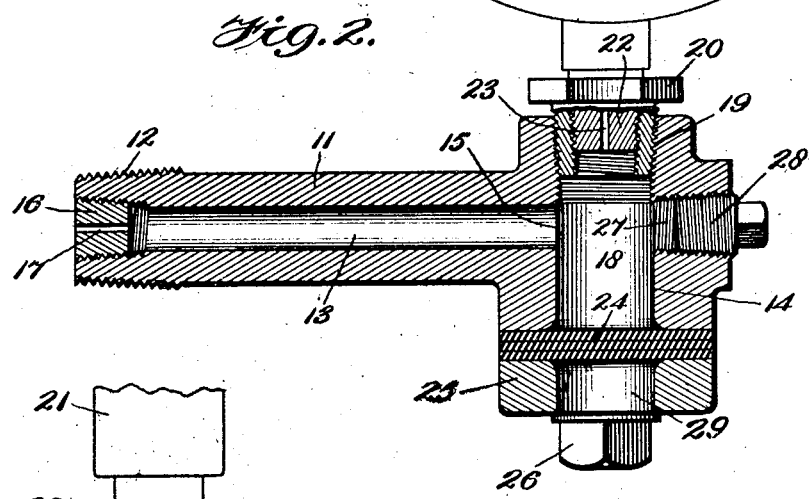
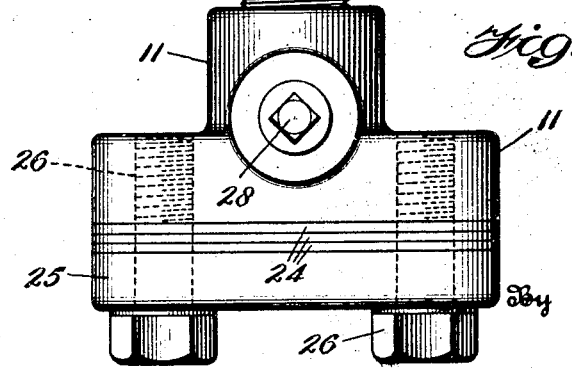
Inventor
Chas. I. Longenecker,
By Barker & Collings
Attorneys Patented May 8, 1934

1,957,894

UNITED STATES PATENT OFFICE 1,957,894

VIBRATION DAMPENER FOR FLUID PRESSURE GAUGES

Charles I. Longenecker, Wauwatosa, Wis., assignor to Chain Belt Company, Milwaukee, Wis., a corporation of Wisconsin Application January 6, 1932, Serial No. 585,141

3 Claims. (Cl. 137—71)

This invention relates to vibration dampeners for fluid pressure gauges and the like and has for one of its objects to provide a device of this character which will be simple in construction, comparatively inexpensive to manufacture and more efficient in use than those which have been heretofore proposed.

In the indicating or recording of fluid pressures by the usual type of pressure gauge, the gauge needle or other indicating element is frequently subject to comparatively wide and rapid fluctuations where corresponding variations occur in the pressure of the fluid which is being measured. Such rapid fluctuations in the pressure are destructive to the delicate mechanism of the gauge, and as a result the indications of the gauge become unreliable in a comparatively short time and in many instances the instrument must be replaced.

In one form of portable triplex piston pump developed for use in connection with concrete road work, which demands an unfailing supply of water, often far from municipal mains, a comparatively small quantity of water—80 to 125 gallons per minute—is delivered at pressures up to as high as 500 lbs. per sq. in. The pump normally operates at from 80 to 100 R. P. M., thus giving an aggregate of from 240 to 300 strokes per minute of its three pistons, with an equal number of pressure variations which may range up to 40 lbs. per sq. in. or more. Further, the pressure line from the pump is not ordinarily provided with a reservoir or water storage arrangement, with the result that if a valve be opened, the pressure drops almost instantaneously from say 500 lbs. per sq. in. to less than 100 lbs. per sq. in. The continuous pulsations resulting from the reciprocations of the pump pistons, as well as the wide variations occasioned by the opening and closing of valves in the discharge line rapidly fatigue the metal of the gauge tube to the breaking point, and produce excessive wear upon the bearings and other delicate parts of the instrument, with the result that the gauge soon becomes useless.

The primary object of the present invention is to provide a simple and effective device for absorbing and smoothing out the pressure variations whereby the indications of the gauge indicator may be substantially constant, and the wear and tear upon the delicate gauge mechanism may be materially reduced.

With the above and other objects in view which will appear as the description proceeds the invention consists in the novel details of construction and combinations of parts more fully hereinafter described and particularly pointed out in the appended claims.

Referring to the accompanying drawing forming a part of this specification in which like reference characters designate like parts in all the views:—

Figure 1 is a diagrammatic side elevational view, partly in section, of a portion of a pressure producing pump with a vibration dampener constructed in accordance with the present invention shown in communication with the discharge passage of the said pump;

Figure 2 is an enlarged longitudinal vertical sectional view through the dampener shown in Figure 1; and Figure 3 is an end elevational view of the parts shown in Figure 2, as seen from the right of the said figure.

While the dampener comprising the present invention is of course susceptible of use with a wide variety of pumps and other pressure producing apparatus, for the purpose of illustration it has been here shown as attached to a multiple cylinder reciprocating water pump of the type disclosed and claimed in my prior Patent No. 1,751,413, dated March 18, 1930. Such a pump comprises a framework 5 upon which is mounted a water box or working chamber 6 having an inlet conduit 7 and a discharge passage 8. A plurality of reciprocating pistons or plungers 9 work up and down in the chambers of the water box 6 to force fluid therein through a valve chamber or housing 10 and into the discharge passage 8, all as is disclosed in my said prior patent.

The dampener comprising the present invention, which may be screwed into or otherwise connected with the discharge passage 8, comprises a body member 11 of substantially T-shape in longitudinal section, one end of which is threaded as at 12 for connection with the discharge passage or conduit which is conveying the fluid, the pressure of which is to be measured. The said member is provided with a pair of intersecting bores 13 and 14, here shown as arranged at substantially right angles to one another, with the bore 13 discharging at one end into the bore 14 through a port 15. The opposite end of the bore 13 is provided with a choke plug 16 threaded into the body member substantially as shown in Figure 2 and provided with a restricted passage 17 which controls the flow of fluid through the bore 13 and into the bore 14.

The bore 14 which is preferably, although not necessarily larger in diameter than the bore 13 to constitute a dampening chamber 18, is threaded at one end as at 19 to receive the connection member 20 by means of which the gauge 21 is attached to the dampener. The said connection 20 is also provided with a choke plug 22 having a restricted passage 23 which affords communication between the chamber 18 and the working parts of the gauge 21 as will be readily understood.

The opposite end of the bore 14 is covered by a yieldable member 24 here indicated as comprising a laminated rubber or other similar flexible diaphragm which is removably clamped in position across the said bore by a retaining member 25 which is secured to the body member 11 by suitable bolts 26. The said body member is also provided with a drain opening 27 which is or may be substantially opposite to the port 15 of bore 13 and which opening is normally closed by a plug 28 as will be clear from the drawings. The retaining member 25 is provided with an aperture 29 in alinement with bore 14, so that the diaphragm 24 is open to the atmosphere on one side.

In use the dampener is screwed into the discharge passage such as 8 of the pump or into any other suitable portion of the conduit carrying the fluid whose pressure is to be measured, so that said fluid may enter the chamber 18 through the restricted passage 17 of the choke 16 and bore 13, from which chamber it may pass through the restricted passage 23 of choke 22 to the operating mechanism of the gauge. Any increase in the normal pressure of the fluid will cause a yielding of the resilient diaphragm 24 which will have the effect of reducing the excess pressure upon the operating mechanism of the gauge, with the result that fluctuations in the indications of the gauge needle will be material reduced. Obviously wear and tear upon the operating mechanism of the gauge due to rapid fluctuation in the fluid pressure will likewise be reduced. The choke plugs 16 and 22 have been found to also materially aid in the reduction of fluctuations of the gauge needle.

While one form of the invention has been illustrated and described, it is obvious that those skilled in the art may vary the details of construction as well as the precise arrangement of parts without departing from the spirit of the invention, and therefore it is not wished to be limited to the above disclosure except as may be required by the claims.

What I claim is:

1. A vibration dampener for fluid pressure gauges and the like comprising a body member provided with a pair of intersecting bores, one of which is adapted to feed fluid to the other, one end of said other bore being formed to receive a gauge connection; and a flexible diaphragm secured over the other end of said last named bore, whereby it is subject to and yieldable under variations in the fluid pressure within said bore to reduce fluctuations of the gauge indicator.

2. A vibration dampener for fluid pressure gauges, comprising a body member provided with a pair of intersecting bores, one of which is arranged to feed fluid to the other, one end of said other bore being formed to receive a gauge connection; a flexible imperforate diaphragm over the other end of said last named bore, whereby it is subject to and yieldable under variations in the fluid pressure within said bore to reduce fluctuations of the gauge indicator; and a retaining member secured to said body member for maintaining said diaphragm in operative position, said member having an aperture alined with said last named bore whereby one side of said diaphragm is open to the atmosphere.

3. A vibration dampener for fluid pressure gauges and the like, comprising a body having a fluid-feeding bore, and a second bore constituting a dampening chamber, disposed at an angle to and communicating with said first bore to receive fluid therefrom, said second bore being provided with a gauge connection; and a resilient diaphragm closing said second bore, having one side thereof subject to atmospheric pressure, said diaphragm being subject to and yieldable under variations in the fluid pressure within said bore to reduce fluctuations of the gauge indicator.

CHARLES I. LONGENECKER.